(12) United States Patent
Burford et al.

(10) Patent No.: US 10,604,152 B2
(45) Date of Patent: Mar. 31, 2020

(54) VEHICLE SPEED CONTROL

(71) Applicant: JAGUAR LAND ROVER LIMITED, Whitley, Coventry, Warwickshire (GB)

(72) Inventors: Robert Burford, Winslow (GB); James Kelly, Solihull (GB)

(73) Assignee: JAGUAR LAND ROVER LIMITED, Whitley Coventry (GB)

( * ) Notice: Subject to any disclaimer, the term of this patent is extended or adjusted under 35 U.S.C. 154(b) by 152 days.

(21) Appl. No.: 15/570,211

(22) PCT Filed: Apr. 29, 2016

(86) PCT No.: PCT/EP2016/059626
§ 371 (c)(1),
(2) Date: Oct. 27, 2017

(87) PCT Pub. No.: WO2016/174212
PCT Pub. Date: Nov. 3, 2016

(65) Prior Publication Data
US 2018/0126987 A1  May 10, 2018

(30) Foreign Application Priority Data

Apr. 29, 2015  (GB) .................................. 1507352.1
Apr. 30, 2015  (GB) .................................. 1507503.9

(51) Int. Cl.
*B60W 30/14* (2006.01)
*B60W 30/18* (2012.01)

(52) U.S. Cl.
CPC .... *B60W 30/143* (2013.01); *B60W 30/18072* (2013.01); *B60W 2520/10* (2013.01);
(Continued)

(58) Field of Classification Search
CPC ......... B60W 30/143; B60W 30/18072; B60W 2520/10; B60W 2520/105; B60W 2550/142; B60W 2550/148; B60W 2720/106; B60W 2720/30
USPC .......................................................... 701/93
See application file for complete search history.

(56) References Cited

U.S. PATENT DOCUMENTS 6,266,604 B1    7/2001  Linden
8,954,255 B1 *  2/2015  Crawford ............ B60W 30/143
                                                    701/93
(Continued)

FOREIGN PATENT DOCUMENTS

EP    1010567 A2    6/2000
EP    1355209 A1   10/2003
(Continued)

OTHER PUBLICATIONS

Combined Search and Examination Report for application No. GB1507352.1, dated Nov. 18, 2015, 7 pages.
(Continued)

*Primary Examiner* — Paula L Schneider
(74) *Attorney, Agent, or Firm* — Reising Ethington P.C.

(57) ABSTRACT

A speed control system for a vehicle. The speed control system has a torque control for automatically causing application of positive and negative torque to one or more wheels of a vehicle to cause a vehicle to travel in accordance with a target speed value. The system receives information indicative of a gradient of a driving surface over which the vehicle is driving, with the torque control being configured to control the rate of change of the amount of torque applied to the one or more wheels, in order to attempt to maintain the vehicle traveling in accordance with the target speed value, in dependence at least in part on the gradient of the driving surface.

21 Claims, 7 Drawing Sheets

(52) U.S. Cl.
 CPC . *B60W 2520/105* (2013.01); *B60W 2550/142* (2013.01); *B60W 2550/148* (2013.01); *B60W 2720/106* (2013.01); *B60W 2720/30* (2013.01)

(56) References Cited

U.S. PATENT DOCUMENTS

2009/0037069 A1* 2/2009 Inoue .................. B60W 10/06
 701/94
2011/0282558 A1 11/2011 Park

FOREIGN PATENT DOCUMENTS

| GB | 2508463 A | 6/2014 | | |
|----|-----------|--------|---|---|
| GB | 2521729 A | 7/2015 | | |
| JP | H06344802 A | 12/1994 | | |
| WO | WO2007141631 A2 | 12/2007 | | |
| WO | WO 2014/027071 | * | 2/2014 | ............ B60W 30/14 |
| WO | WO2014027071 A1 | 2/2014 | | |
| WO | WO2014139875 A1 | 9/2014 | | |

OTHER PUBLICATIONS

Combined Search and Examination Report for application No. GB1507503.9, dated Mar. 15, 2016, 7 pages.
International Search Report for International application No. PCT/EP2016/059626, dated Oct. 27, 2016, 8 pages.
Written Opinion for International application No. PCT/EP2016/059626, dated Oct. 27, 2016, 8 pages.
British Examination report for application No. GB1507503.9, dated Nov. 8, 2017, 5 pages.

* cited by examiner

VEHICLE SPEED CONTROL

INCORPORATION BY REFERENCE

The content of co-pending UK patent applications GB1214651.0 and GB1202879.1 are hereby incorporated by reference. The content of U.S. Pat. No. 7,349,776 and co-pending international patent applications PCT/EP2013/053385 and WO2014/139875 are incorporated herein by reference. The content of UK patent applications GB1111288.5, GB1211910.3 and GB1202427.9 are also incorporated herein by reference.

FIELD OF THE INVENTION

The invention relates to a system for controlling the speed of a vehicle. In particular, but not exclusively, the invention relates to a system for controlling the speed of a land-based vehicle which is capable of driving in a variety of different and extreme terrains and conditions.

BACKGROUND

In known vehicle speed control systems, typically referred to as cruise control systems, the vehicle speed is maintained on-road once set by the user without further intervention by the user so as to improve the driving experience for the user by reducing workload. Cruise control speed (or cruise set-speed) is settable by the vehicle driver, typically by pressing a button when the vehicle is at the desired speed. Plus and minus buttons provide for incremental speed variation while the cruise control is set.

Once the user has selected a speed at which the vehicle is to be maintained, the vehicle is maintained at that speed for as long as the user does not apply a brake or, in the case of a vehicle having a manual transmission, depress a clutch pedal. The cruise control system takes its speed signal from a driveshaft speed sensor or wheel speed sensors. When the brake or the clutch is depressed, the cruise control system is disabled so that the user can override the cruise control system to change the vehicle speed without resistance from the system. When the cruise control system is active, if the user depresses the accelerator pedal the vehicle speed will increase, but once the user removes his foot from the accelerator pedal the vehicle reverts to the pre-set cruise speed by coasting.

Such systems are usually operable only above a certain speed, typically around 15-20 kph, and are ideal in circumstances in which the vehicle is travelling in steady traffic conditions, and particularly on highways or motorways. In congested traffic conditions, however, where vehicle speed tends to vary widely, cruise control systems are ineffective, and especially where the systems are inoperable because of a minimum speed requirement. A minimum speed requirement is often imposed on cruise control systems so as to reduce the likelihood of low speed collision, for example when parking. Such systems are therefore ineffective in certain driving conditions (e.g. low speed) and are set to be automatically disabled in circumstances in which a user may not consider it to be desirable to do so.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is detected by the radar detection system, the system sends a signal to the engine or the braking system to slow the vehicle down accordingly, to maintain a safe following distance.

Known cruise control systems also cancel in the event that a wheel slip event is detected requiring intervention by a traction control system (TCS) or stability control system (SCS). Accordingly, they are not well suited to maintaining vehicle progress when driving in off road conditions where such events may be relatively common.

Some vehicles are adapted for off-highway use, and it would be desirable to provide low-speed cruise control for such vehicles so as to permit progress to be maintained over rough terrain. In off-highway conditions cruise control may permit a driver, particularly a novice driver, to concentrate upon activities such as steering.

It is against this background that the present invention has been conceived. Embodiments of the invention may provide an apparatus, a method or a vehicle which addresses the above problems. Other aims and advantages of the invention will become apparent from the following description, claims and drawings.

It is also known to provide a control system for a motor vehicle for controlling one or more vehicle subsystems. U.S. Pat. No. 7,349,776 discloses a vehicle control system comprising a plurality of subsystem controllers including an engine management system, a transmission controller, a steering controller, a brakes controller and a suspension controller. The subsystem controllers are each operable in a plurality of subsystem function or configuration modes. The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the subsystems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response (TR) (RTM) System or controller. The driving modes may also be referred to as terrain modes, terrain response modes, or control modes.

SUMMARY OF THE INVENTION

In one aspect of the present invention for which protection is sought there is provided a speed control system for a vehicle, comprising:

means for automatically causing application of positive and negative torque to one or more wheels of a vehicle to cause a vehicle to travel in accordance with a target speed value v_target;

means for controlling a rate of change of speed of a vehicle by application of positive and negative torque to one or more wheels; and means for receiving information relating to a gradient of a driving surface over which the vehicle is driving, the means for controlling the rate of change of speed being configured to control the rate of change of speed in dependence at least in part on the driving surface gradient.

It is to be understood that in some embodiments the means for controlling a rate of change of speed of a vehicle by application of positive and negative torque to one or more wheels may be configured to apply positive torque when required, for example when it is desirable to maintain a current value of vehicle speed and an external force opposes the maintaining of that speed, or when it is required to accelerate the vehicle, and to apply negative torque when required, for example when it is required to maintain a current speed in the presence of a force accelerating the vehicle such as gravity, or decrease vehicle speed. In some embodiments the means for controlling a rate of change of speed of a vehicle by application of positive and negative torque to one or more wheels may be configured to apply both positive and negative torque to one or more wheels substantially simultaneously when required.

It will be understood from the following description that a vehicle suited for off road driving may have a number of terrain response modes in which it can be configured, the terrain response modes each corresponding to a vehicle configuration or control strategy suited to a particular terrain type. The terrain types may include: sand; mud and ruts; ice; grass, gravel, snow; wading (water crossing); and a general mode referred to as special programs off of SPO.

It will also be understood from the following that the terrain response mode may be set by the driver via an HMI interface that enables the driver to input the terrain type over which he is driving or intends to drive the vehicle, or alternatively the vehicle may include a plurality of vehicle parameter sensors, and optionally environmental sensors, and a controller configured to analyze the signals form the sensors, to determine the terrain type over which the vehicle is being driven, and automatically configure the vehicle for travel over the prevailing terrain type.

In one aspect of the invention for which protection is sought there is provided a speed control system for a vehicle, comprising:

torque control means for automatically causing application of positive and negative torque to one or more wheels of a vehicle to cause a vehicle to travel in accordance with a target speed value; and means for receiving information indicative of a gradient of a driving surface over which the vehicle is driving, the torque control means being configured to control the rate of change of the amount of torque applied to the one or more wheels, in order to attempt to maintain the vehicle traveling in accordance with the target speed value, in dependence at least in part on the gradient of the driving surface.

This feature has the advantage that the responsiveness of a vehicle to deviations of the actual speed of the vehicle from the target speed value may be adjusted in dependence on the driving surface gradient in order to enhance vehicle composure and driver enjoyment of the vehicle. It is to be understood that, if driving uphill over relatively slippery terrain, an increased responsiveness to deviations of vehicle speed below the target speed reduces the risk that the vehicle fails to make adequate progress over the terrain, particularly if deviations below the target speed (known as 'undershoot') occur.

Optionally, the torque control means is configured to attempt to cause the vehicle to travel at a speed substantially equal to the target speed, the torque control means being configured to control the rate of change of the amount of torque applied to the one or more wheels, in order to attempt to maintain the vehicle traveling substantially at the target speed value, in dependence at least in part on the gradient of the driving surface.

Optionally, the torque control means is configured wherein when actual vehicle speed is less than the target speed value and the information indicative of surface gradient indicates the vehicle is traveling uphill, the torque control means attempts to cause the vehicle to accelerate towards the target speed value at a rate that is higher than when driving on a substantially horizontal surface.

In other words, when the vehicle is travelling uphill, i.e. on a driving surface having a positive gradient relative to a substantially horizontal driving surface, the torque control means may be configured to attempt to cause the vehicle to accelerate towards the target speed value when speed is below the target speed value at a rate that is higher than when driving on a substantially horizontal surface. That is, the torque control means may be configured to attempt to cause the vehicle to accelerate towards the target speed value when speed is below the target speed value at a more aggressive rate than when driving on a substantially horizontal surface.

Optionally, the torque control means is configured wherein when actual vehicle speed is less than the target speed value, the torque control means attempts to cause the vehicle to accelerate towards the target speed value at a rate that is higher for higher values of uphill driving surface gradient.

Thus, the torque control means may attempt to increase the amount of torque at a rate that increases with increasing positive (uphill) driving surface gradient. That is, the torque control means may attempt to increase the amount of torque at a rate that is more aggressive with increasing gradient steepness.

Alternatively, the torque control means is configured wherein when actual vehicle speed is less than the target speed value and the information indicative of surface gradient indicates the vehicle is traveling uphill, the torque control means attempts to cause the vehicle to accelerate towards the target speed value at a rate that is lower than when driving on a substantially horizontal surface.

In other words, when the vehicle is travelling uphill, i.e. on a driving surface having a positive gradient relative to a substantially horizontal driving surface, the torque control means may be configured to attempt to cause the vehicle to accelerate towards the target speed value when speed is below the target speed value at a rate that is less than the corresponding rate when driving on a substantially horizontal surface. That is, the torque control means may be configured to attempt to cause the vehicle to accelerate towards the target speed value when speed is below the target speed value at a less aggressive rate than when driving on a substantially horizontal surface, for given values of actual vehicle speed and target speed.

Optionally, the torque control means is configured wherein when actual vehicle speed is less than the target speed value, the torque control means attempts to cause the vehicle to accelerate towards the target speed value at a rate that is increasingly lower for increasingly higher values of uphill driving surface gradient.

Thus, the torque control means may attempt to increase the amount of torque at a rate that decreases with increasing positive (uphill) driving surface gradient. That is, the torque control means may attempt to increase the amount of torque at a rate that is progressively less aggressive with progressively increasing gradient steepness.

As discussed below, the control system may determine whether to employ increasingly aggressive rates of acceleration with increasing steepness of the driving surface, or decreasingly aggressive rates of acceleration with increasing steepness, in further dependence at least in part on the identity of a driving mode in which the vehicle is operating. In some embodiments the control system may make this determination in dependence at least in part on the nature of the terrain over which the vehicle is driving. In some embodiments the driving mode may be indicative of the nature of the terrain over which the vehicle is driving.

Optionally, the torque control means is configured wherein when actual vehicle speed is greater than the target speed value, the torque control means causes a reduction in torque applied to the one or more wheels in order to attempt to cause the vehicle to travel at a speed substantially equal to the target speed at a rate that is lower for a given deviation in speed above the target speed than in the case of a corresponding deviation below the target speed value.

Thus, the control system may respond to deviations above the target speed (referred to as 'overshoot') less aggressively than deviations below the target speed.

The torque control means may be configured wherein when actual vehicle speed is greater than the target speed value and the vehicle is traveling uphill, the torque control means causes a reduction in torque applied to the one or more wheels in order to attempt to cause the vehicle to travel at a speed substantially equal to the target speed at a rate that is substantially equal to or lower than in the case of a corresponding deviation in vehicle speed above the target speed while traveling over a substantially horizontal driving surface.

Optionally, the torque control means is configured wherein when actual vehicle speed is greater than the target speed value and the vehicle is travelling downhill, the torque control means causes a reduction in torque applied to the one or more wheels in order to attempt to cause the vehicle to travel at a speed substantially equal to the target speed at a rate that is substantially equal to or lower than in the case of a corresponding deviation in vehicle speed above the target speed while traveling over a substantially horizontal driving surface.

Thus, the control system may respond to vehicle speed deviations above the target speed (referred to as 'overshoot') less aggressively when going uphill and/or downhill relative to driving over substantially horizontal surfaces. Alternatively the control system may respond more aggressively. Other arrangements may be useful.

Optionally, the torque control means is configured wherein when actual vehicle speed is greater than the target speed value and the vehicle is travelling downhill, the torque control means causes a reduction in torque applied to the one or more wheels, in order to attempt to cause the vehicle to travel at a speed substantially equal to the target speed, at a rate that is greater than in the case of a corresponding deviation in vehicle speed above the target speed while traveling over a substantially horizontal driving surface.

Thus, the control system may attempt to correct vehicle speed more aggressively in the event of overshoot when travelling downhill due to the effect of gravity in tending to promote overshoot. Accordingly, the amount of any further increase in vehicle speed may be reduced due to the relatively aggressive response.

The control system may be configured to cause the vehicle to accelerate from a first speed to the target speed value, where the first speed is less than the target speed value, at least in part according to stored data in respect of target rate of acceleration as a function of speed, wherein the value of target rate of acceleration according to which the vehicle is caused to accelerate is determined in further dependence at least in part on the driving surface gradient.

The control system may determine the target rate of acceleration in dependence at least in part on the difference between the current vehicle speed and target vehicle speed.

The control system may be configured to cause a vehicle to decelerate from a second speed to the target speed value, where the second speed is greater than the target speed value, according to stored data in respect of target rate of deceleration as a function of speed, wherein the target rate of deceleration according to which the vehicle is caused to decelerate is determined in further dependence at least in part on the driving surface gradient.

The control system may determine the target rate of deceleration in dependence at least in part on the difference between the current vehicle speed and target vehicle speed.

The control system may be configured to control a rate of change of vehicle speed towards the target speed iteratively by causing the vehicle to attempt to achieve an intermediate instant target speed, the value of intermediate instant target speed and therefore vehicle speed being caused to change in an iterative manner towards the target speed value at a required rate.

The control system may be operable to control a rate of change of vehicle speed so as not to exceed a prescribed jerk value.

Optionally, the prescribed jerk value is set in dependence on the gradient of the driving surface.

Optionally, the prescribed jerk value during a decrease in vehicle speed towards the target speed is higher for lower values of positive driving surface gradient and lower for higher values of positive driving surface gradient.

Alternatively, in some embodiments the prescribed jerk value during a decrease in vehicle speed towards the target speed may be lower for lower values of positive driving surface gradient and higher for higher values of positive driving surface gradient.

Optionally, the prescribed jerk value during an increase in vehicle speed is higher for higher values of driving surface gradient and lower for lower values of driving surface gradient.

Optionally, the torque control means is configured to control the rate of change of the amount of torque applied to the one or more wheels, in order to attempt to maintain the vehicle traveling in accordance with the target speed value, in further dependence at least in part on the identity of a driving mode in which the vehicle is operating.

Optionally, the driving mode is one of a plurality of driving modes in which each one of a plurality of vehicle subsystems is caused to operate in one of a plurality of configuration modes of that subsystem, the subsystem configuration mode being determined in dependence on the selected driving mode.

The control system may be configured wherein the torque control means is operable to control the rate of change of the amount of torque applied to the one or more wheels, in order to attempt to maintain the vehicle traveling in accordance with the target speed value, in dependence at least in part on the information indicative of driving surface gradient only if the vehicle is operating in a driving mode that is a member of a predetermined group of one or more of the plurality of driving modes.

The control system may be configured wherein when actual vehicle speed is less than the target speed value and the information indicative of surface gradient indicates the vehicle is traveling uphill, the torque control means attempts to cause the vehicle to accelerate towards the target speed value at a rate that is lower than when driving on a substantially horizontal surface if the vehicle is operating in a driving mode that is a member of a first group of one or more of the driving modes and is not a driving mode that is not a member of the first group.

Optionally, the first group of driving modes comprises at least one driving mode adapted for driving on a driving surface of relatively low surface coefficient of friction.

Optionally, the first group of driving modes comprises at least one driving mode adapted for driving on a driving surface of relatively low surface coefficient of friction excluding a mode adapted for driving on sand.

It is to be understood that sand represents a surface that is characterized by relatively high drag and relatively highly deformability as well as relatively low surface coefficient of friction. Accordingly, when driving uphill over sand and undershoot occurs, it is advisable to respond with a relatively rapid, i.e. aggressive, increasing in torque applied to the one or more wheels, in order to reduce the risk of the vehicle becoming bogged down or otherwise immobilized. Slip of wheels when travelling over sand can be effective in enhancing traction by enabling the wheels to 'excavate' sand, compounding the material to improve tractive force.

In contrast, when driving over a surface of relatively low surface coefficient other than sand, such as surfaces that are of relatively low drag, a less aggressive increase in torque may be advisable when undershoot occurs in order to reduce the risk of excessive wheel spin and potential resultant loss of traction. Furthermore, undesirable modification of the driving surface can occur as a consequence of excessive wheel slip. In the case of a grassy surface, being typically of relatively low surface coefficient of friction, modification of the surface can result in the exposure of a surface of even lower surface coefficient of friction such as mud, making progress over the surface even more difficult.

Optionally, the first group of driving modes comprises at least one driving mode adapted for driving on at least one of a snowy surface, an icy surface, grass, gravel, snow and mud.

The first group of driving modes may include a snow and ice mode, a grass/gravel/snow mode and/or a mud/ruts mode. Other modes may be useful in addition or instead.

Optionally, the subsystems include at least one of a powertrain subsystem, a brakes subsystem and a suspension subsystem.

Optionally, the torque control means comprises an electric controller configured to communicate with a powertrain controller and a brakes controller.

Optionally, the electric controller further comprises the means for receiving information indicative of the gradient of the driving surface.

Optionally, the means for receiving indicative of the gradient of the driving surface comprises an electrical input for receiving an electrical signal indicative of the gradient of the driving surface.

A speed control system as described above, wherein:

said torque control means comprises an electronic processor having an electrical input for receiving a signal proving said information indicative of a gradient of a driving surface over which the vehicle is driving; and an electronic memory device electrically coupled to the electronic processor and having instructions stored therein, wherein the processor is configured to access the memory device and execute the instructions stored therein such that it is operable to:

cause application of positive and negative torque to one or more wheels of a vehicle to cause a vehicle to travel in accordance with a target speed value, and control the rate of change of the amount of torque applied to the one or more wheels, in order to attempt to maintain the vehicle traveling in accordance with the target speed value, in dependence at least in part on the signal providing said information indicative of a gradient of a driving surface.

In a further aspect of the invention for which protection is sought there is provided a vehicle comprising a control system according to any preceding aspect.

In one aspect of the invention for which protection is sought there is provided a method of controlling a vehicle implemented by means of a control system, comprising:

automatically causing application of positive and negative torque to one or more wheels of a vehicle to cause a vehicle to travel in accordance with a target speed value; and receiving information indicative of a gradient of a driving surface over which the vehicle is driving, the method comprising controlling the rate of change of the amount of torque applied to the one or more wheels, in order to attempt to maintain the vehicle traveling in accordance with the target speed value, in dependence at least in part on the gradient of the driving surface.

In one aspect of the invention for which protection is sought there is provided a speed control system for a vehicle, comprising:

means for automatically causing application of positive and negative torque to one or more wheels of a vehicle to cause a vehicle to travel in accordance with a target speed value;

means for controlling a rate of change of speed of a vehicle by application of positive and negative torque to one or more wheels; and means for receiving information relating to the gradient of a driving surface and the identity of a terrain response mode in which the vehicle is configured, the means for controlling the rate of change of speed being configured to control the rate of change of speed in dependence at least in part on said information relating to the gradient of a driving surface and the identity of a terrain response mode in which the vehicle is configured.

Optionally, the control system may receive information relating to the amount of drag imposed on the vehicle by a driving surface and control the rate of change of speed in further dependence at least in part on said information.

It is to be understood that the information relating to one or more of a terrain response mode and an amount of drag imposed may be information or data indicative of one or more of a terrain response mode and an amount of drag.

Some embodiments of the present invention have the advantage that a speed control system may be configured to control application of torque to one or more wheels of a vehicle travelling over terrain that imposes a relatively large amount of drag on a vehicle in a different manner to a vehicle travelling over terrain that imposes a relatively small amount of drag on a vehicle. As a consequence, in some embodiments a risk that a vehicle fails to make adequate progress over terrain of relatively high drag may be reduced. Furthermore, vehicle composure may be enhanced, because vehicle performance and handling characteristics are affected substantially by the amount of drag imposed on a vehicle. By taking account of the amount of drag, or the selected terrain mode, when controlling the rate of change of speed, a vehicle may be caused to operate in a more comfortable and predictable manner.

Some embodiments of the invention relate to travel over relatively high drag surfaces such as sand. It is to be understood that in order to maintain vehicle progress when relatively high drag forces are imposed on a vehicle, a relatively high rate of acceleration may be required compared with that required in the case of relatively low drag conditions, especially when attempting to negotiate an incline. For example, if a vehicle is travelling over relatively flat, horizontal terrain that imposes a relatively large amount of drag on the vehicle, such as over sand, and the vehicle begins to ascend an incline such as a side of a sand dune, a rate of deceleration of the vehicle due to the effect of gravity as a consequence of the incline may be relatively high unless an increase in powertrain torque takes place. Under such circumstances, when vehicle speed begins to fall below the target speed as the vehicle begins to climb the dune, the control system may cause a powertrain of a vehicle to impose a relatively high rate of acceleration on the vehicle in order to prevent the vehicle from failing to make adequate progress over the dune. Such circumstances may also occur when ascending a muddy hill where a relatively large amount of wheel slip occurs at the vehicle wheels.

Similarly, when a vehicle crests a dune and begins to descend a dune, application of negative torque to one or more wheels in order prevent over-shoot or over-run of a target speed may be required in some circumstances. However, application of brake torque when travelling over relatively high drag surfaces such as sand may have the effect of abruptly arresting vehicle progress and causing a loss of vehicle composure, particularly when descending an incline. In the case of sandy terrain at least, a vehicle may become immobilized in some cases due to one or more wheels sinking into the surface of the terrain when negative torque is applied to a wheel. Accordingly, in order to reduce vehicle speed when descending an incline, the control system may be configured to decrease an amount of brake torque applied to one or more wheels at a given moment in time relative to that which would be applied when travelling over a different surface such as dry asphalt. In some embodiments, substantially no brake torque may be applied. Rather, a drag force on the vehicle due to the terrain may be employed to cause deceleration. Positive drive torque may be maintained, of reduced amount, in order to cause deceleration without applying brake torque, in some embodiments.

In an aspect of the invention for which protection is sought there is provided a carrier medium carrying a computer readable code for controlling a vehicle to carry out the method of another aspect.

In an aspect of the invention for which protection is sought there is provided a computer program product executable on a processor so as to implement the method of another aspect.

In an aspect of the invention for which protection is sought there is provided a computer readable medium loaded with the computer program product of another aspect.

In an aspect of the invention for which protection is sought there is provided a processor arranged to implement the method of another aspect, or the computer program product of another aspect.

Within the scope of this application it is envisaged that the various aspects, embodiments, examples and alternatives, and in particular the features thereof, may be taken independently or in any combination thereof. For example, features disclosed in connection with one embodiment are applicable to all embodiments, unless such features are incompatible.

BRIEF DESCRIPTION OF DRAWINGS

The present invention will now be described, by way of example only, with reference to the accompanying drawings, in which.

DETAILED DESCRIPTION

References herein to a block such as a function block are to be understood to include reference to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

Figure 1:
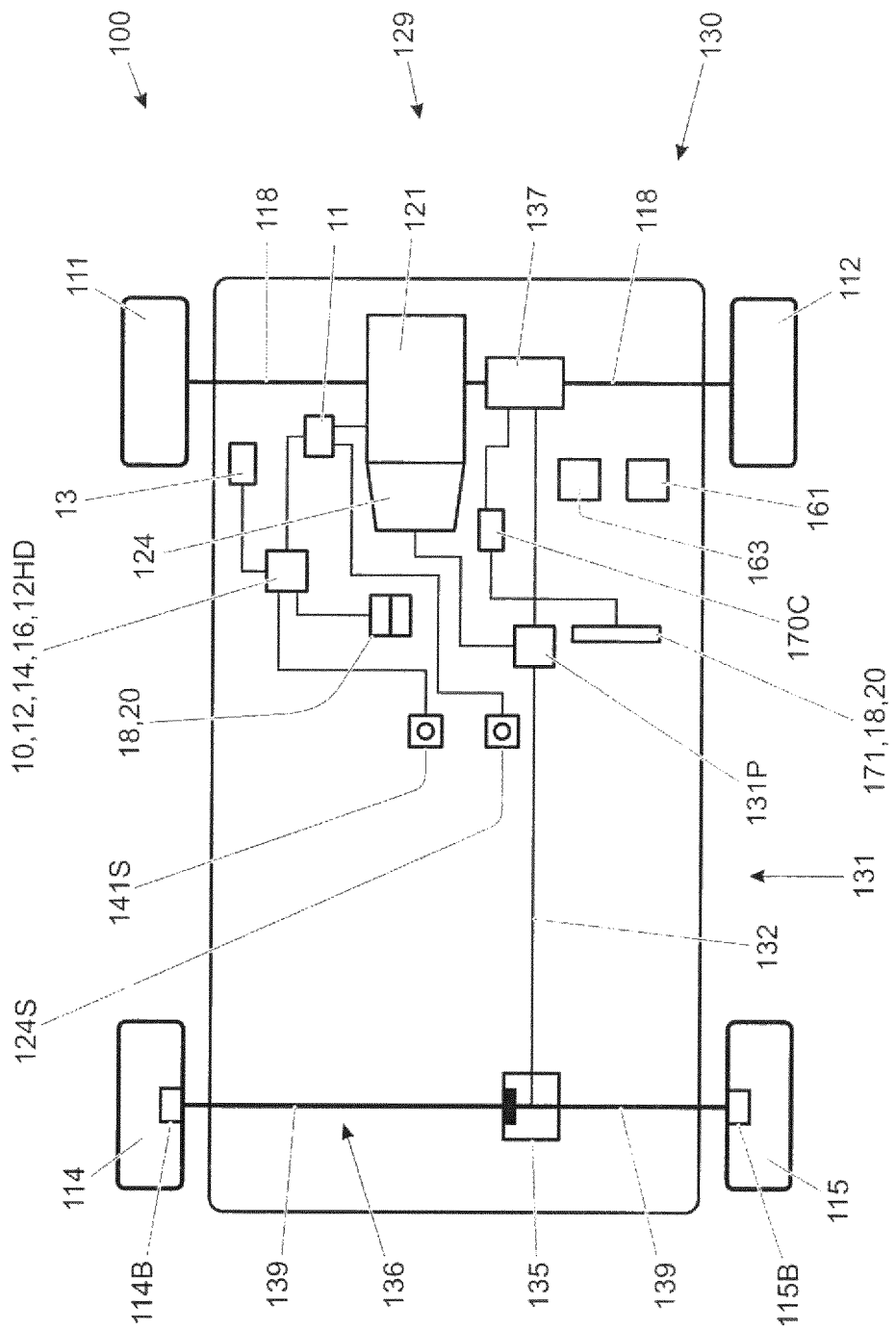
FIG. 1 is a schematic illustration of a vehicle according to an embodiment of the invention in plan view.
Figure 2:
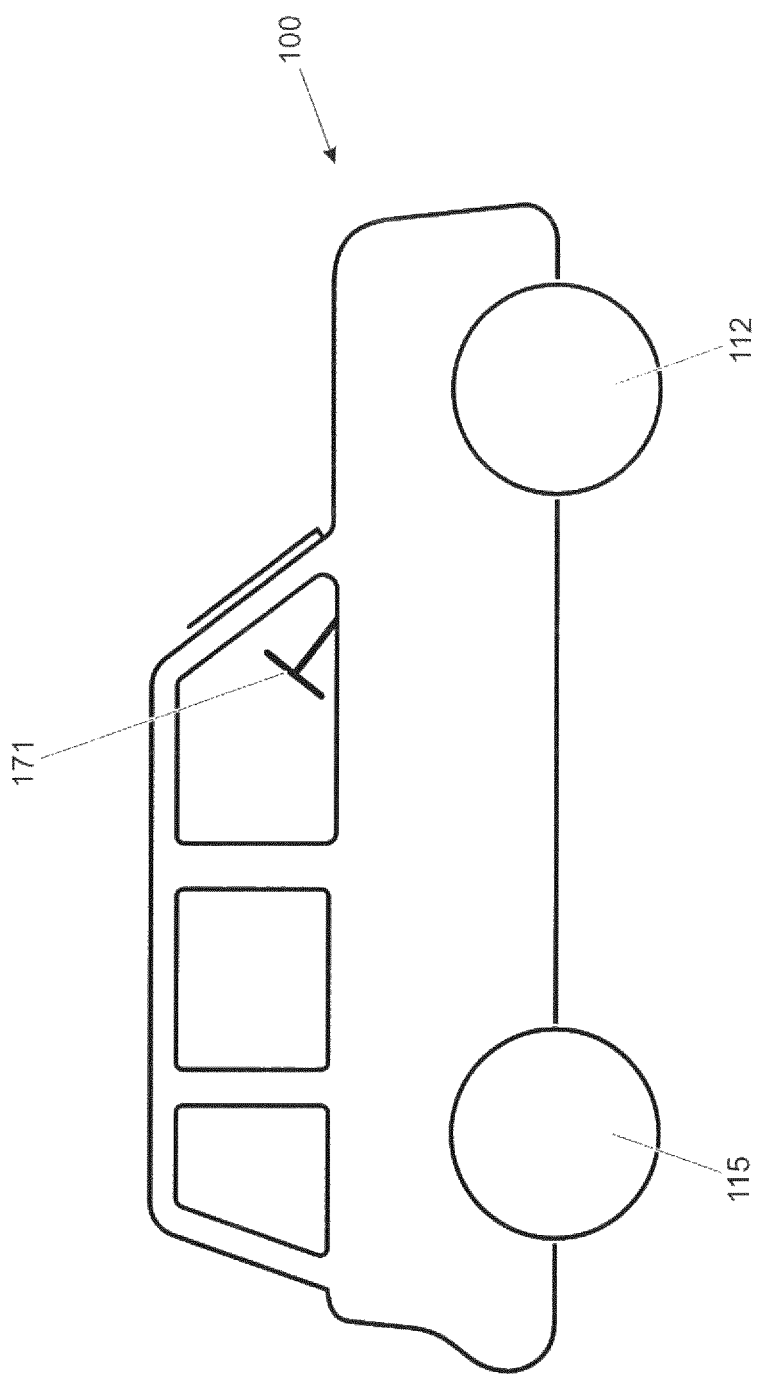
FIG. 2 shows the vehicle of FIG. 1 in side view.

FIG. 1 shows a vehicle 100 according to an embodiment of the present invention. The vehicle 100 has a powertrain 129 that includes an engine 121 that is connected to a driveline 130 having an automatic transmission 124. It is to be understood that embodiments of the present invention are also suitable for use in vehicles with manual transmissions, continuously variable transmissions or any other suitable transmission.

In the embodiment of FIG. 1 the transmission 124 may be set to one of a plurality of transmission operating modes, being a park mode, a reverse mode, a neutral mode, a drive mode or a sport mode, by means of a transmission mode selector dial 124S. The selector dial 124S provides an output signal to a powertrain controller 11 in response to which the powertrain controller 11 causes the transmission 124 to operate in accordance with the selected transmission mode.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139.

Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing operation in a two wheel drive mode or a four wheel drive mode. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
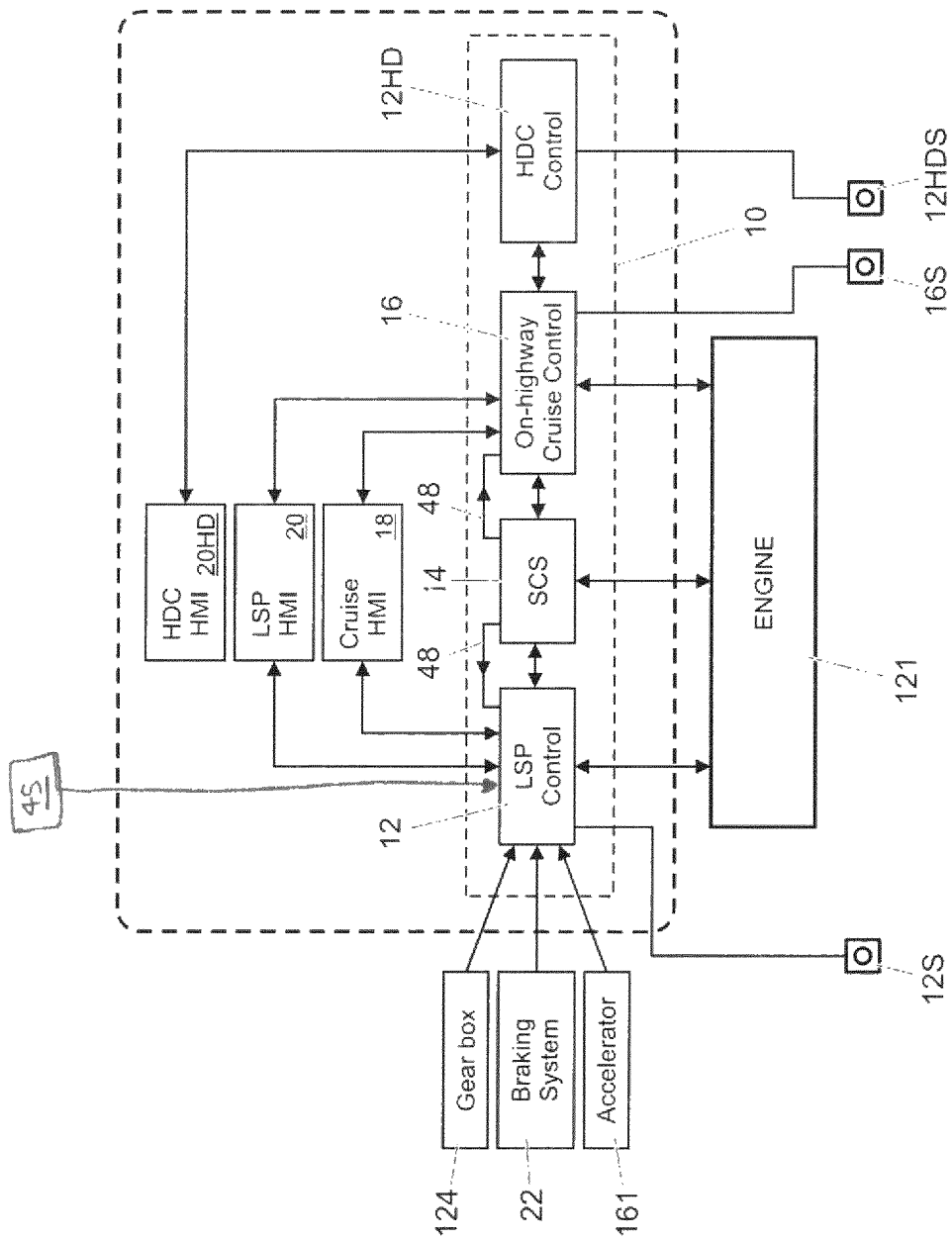
FIG. 3 is a high level schematic diagram of an embodiment of the vehicle speed control system of the present invention, including a cruise control system and a low-speed progress control system.

A control system for the vehicle engine 121 includes a central controller 10, referred to as a vehicle control unit (VCU) 10, the powertrain controller 11, a brake controller 13 (an anti-lock braking system (ABS) controller) and a steering controller 170C. The ABS controller 13 forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 shown in FIG. 3, a stability control system (SCS) 14, a cruise control system 16 and a hill descent control (HDC) system 12HD. The SCS 14 improves the safety of the vehicle 100 by detecting and managing loss of traction. When a reduction in traction or steering control is detected, the SCS 14 is operable automatically to command the ABS controller 13 to apply one or more brakes of the vehicle to help to steer the vehicle 100 in the direction the user wishes to travel. In the embodiment shown the SCS 14 is implemented by the VCU 10. In some alternative embodiments the SCS 14 may be implemented by the ABS controller 13.

Although not shown in detail in FIG. 3, the VCU 10 further includes a Traction Control (TC) function block. The TC function block is implemented in software code run by a computing device of the VCU 10. The ABS controller 13 and TC function block provide outputs indicative of, for example, TC activity, ABS activity, brake interventions on individual wheels and engine torque requests from the VCU 10 to the engine 121 in the event a wheel slip event occurs. Each of the aforementioned events indicate that a wheel slip event has occurred. In some embodiments the ABS controller 13 implements the TC function block. Other vehicle sub-systems such as a roll stability control system or the like may also be included.

Figure 5:
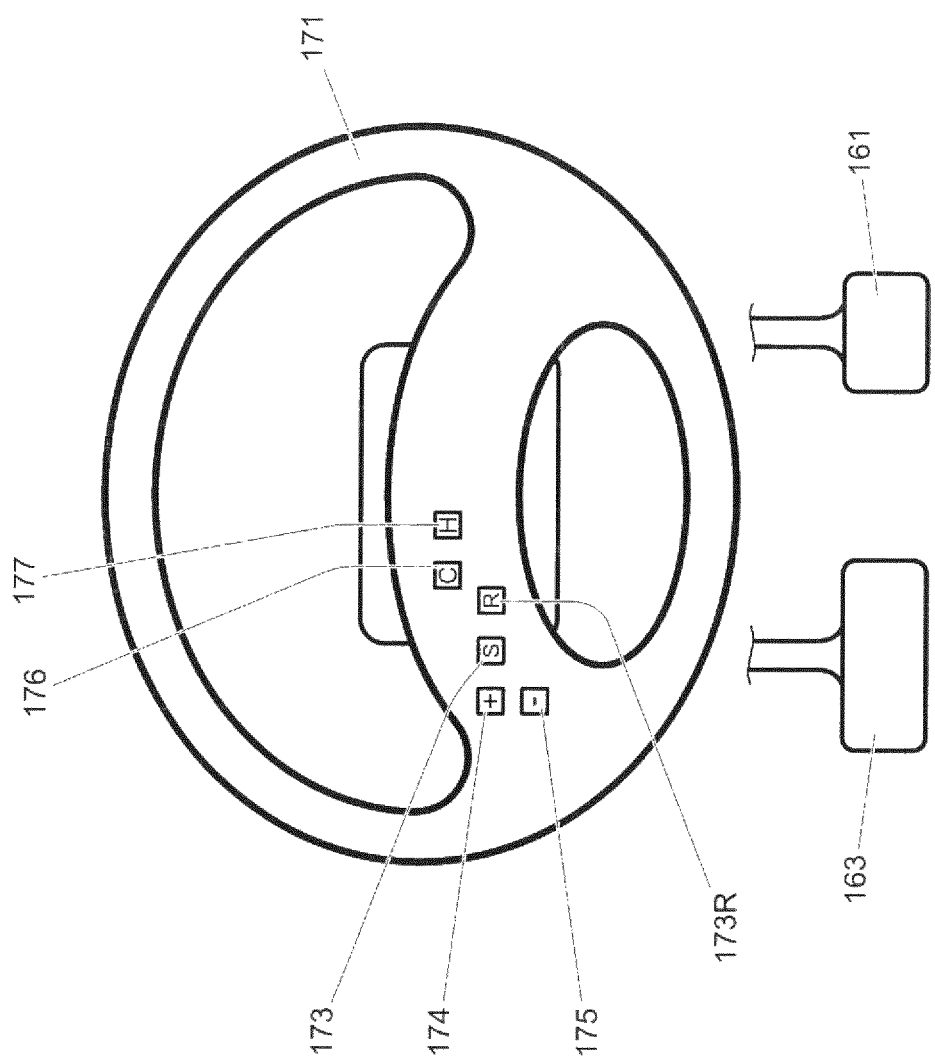
FIG. 5 illustrates a steering wheel and brake and accelerator pedals of a vehicle according to an embodiment of the present invention.

As noted above the vehicle 100 also includes a cruise control system 16 which is operable to automatically maintain vehicle speed at a selected speed when the vehicle is travelling at speeds in excess of 25 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 5). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a '+' button 174 allows the value of cruise_set-speed to be increased while depression of a '−' button 175 allows the value of cruise_set-speed to be decreased. A resume button 173R is provided that is operable to control the cruise control system 16 to resume speed control at the instant value of cruise_set-speed following driver over-ride. It is to be understood that known on-highway cruise control systems including the present system 16 are configured so that, in the event that the user depresses the brake or, in the case of vehicles with a manual transmission, a clutch pedal, control of vehicle speed by the cruise control system 16 is cancelled and the vehicle 100 reverts to a manual mode of operation which requires accelerator or brake pedal input by a user in order to maintain vehicle speed. In addition, detection of a wheel slip event, as may be initiated by a loss of traction, also has the effect of cancelling control of vehicle speed by the cruise control system 16. Speed control by the system 16 is resumed if the driver subsequently depresses the resume button 173R.

The cruise control system 16 monitors vehicle speed and any deviation from the target vehicle speed is adjusted automatically so that the vehicle speed is maintained at a substantially constant value, typically in excess of 25 kph. In other words, the cruise control system is ineffective at speeds lower than 25 kph. The cruise control HMI 18 may also be configured to provide an alert to the user about the status of the cruise control system 16 via a visual display of the HMI 18. In the present embodiment the cruise control system 16 is configured to allow the value of cruise_set-speed to be set to any value in the range 25-150 kph.

The LSP control system 12 also provides a speed-based control system for the user which enables the user to select a very low target speed at which the vehicle can progress without any pedal inputs being required by the user to maintain vehicle speed. Low-speed speed control (or progress control) functionality is not provided by the on-highway cruise control system 16 which operates only at speeds above 25 kph.

In the present embodiment, the LSP control system 12 is activated by pressing a HDC system selector button 177 mounted on steering wheel 171 for less than a prescribed time period (in the present embodiment the prescribed time period is 3 s although other values are also useful), and subsequently pressing the 'set +' button 174. In some embodiments a dedicated LSP control system selector button is mounted on the steering wheel 171, by means of which the LSP control system 12 is activated. The system 12 is operable to apply selective powertrain, traction control and braking actions to one or more wheels of the vehicle 100, collectively or individually.

The LSP control system 12 is configured to allow a user to input a desired value of set-speed parameter, user set-speed to the LSP control system 12 via a low-speed progress control HMI (LSP HMI) 20 (FIG. 1, FIG. 3) which shares certain input buttons 173-175 with the cruise control system 16 and HDC control system 12HD. Provided the vehicle speed is within the allowable range of operation of the LSP control system 12 (which is the range from 2 to 30 kph in the present embodiment although other ranges are also useful) and no other constraint on vehicle speed exists while under the control of the LSP control system 12, the LSP control system 12 controls vehicle speed in accordance with a LSP control system set-speed value LSP_set-speed which is set substantially equal to user_set-speed. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behavior when slip is detected.

The LSP control HMI 20 is provided in the vehicle cabin so as to be readily accessible to the user. The user of the vehicle 100 is able to input to the LSP control system 12, via the LSP HMI 20, an indication of the speed at which the user desires the vehicle to travel (referred to as "the target speed") by means of the 'set-speed' button 173 and the '+'/'−' buttons 174, 175 in a similar manner to the cruise control system 16. The LSP HMI 20 also includes a visual display by means of which information and guidance can be provided to the user about the status of the LSP control system 12.

The LSP control system 12 receives an input from the ABS controller 13 of the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161, and an input from the transmission or gearbox 124. This latter input may include signals representative of, for example, the speed of an output shaft of the gearbox 124, an amount of torque converter slip and a gear ratio request. Other inputs to the LSP control system 12 include an input from the cruise control HMI 18 which is representative of the status (ON/OFF) of the cruise control system 16, an input from the LSP control HMI 20, and an input from a gradient sensor 45 indicative of the gradient of the driving surface over which the vehicle 100 is driving. In the present embodiment the gradient sensor is a gyroscopic sensor. In some alternative embodiments the LSP control system 12 receives a signal indicative of driving surface gradient from another controller such as the ABS controller 13. The ABS controller 13 may determine gradient based on a plurality of inputs, optionally based at least in part on signals indicative of vehicle longitudinal and lateral acceleration and a signal indicative of vehicle reference speed (v_actual) being a signal indicative of actual vehicle speed over ground. Methods for the calculation of vehicle reference speed based for example on vehicle wheel speeds are well known. For example in some known vehicles the vehicle reference speed may be determined to be the speed of the second slowest turning wheel, or the average speed of all the wheels. Other ways of calculating vehicle reference speed may be useful in some embodiments, including by means of a camera device or radar sensor.

When the HDC system 12HD is active, the system 12HD controls the braking system 22 in order to limit vehicle speed to a value corresponding to that of a HDC set-speed parameter HDC_set-speed which may be set by a user. The HDC set-speed parameter may also be referred to as an HDC target speed. Provided the user does not override the HDC system 12HD by depressing the accelerator pedal 161 when the HDC system 12HD is active, the HDC system 12HD controls the braking system 22 (FIG. 3) to prevent vehicle speed from exceeding HDC_set-speed. In the present embodiment the HDC system 12HD is not operable to apply positive drive torque. Rather, the HDC system 12HD is only operable to cause negative brake torque to be applied, via the braking system 22.

A HDC system HMI 20HD is provided by means of which a user may control the HDC system 12HD, including setting the value of HDC_set-speed. The HDC system is activated by depressing the HDC selector button 177 for more than the prescribed period (3 s in the present embodiment as noted above).

As noted above, the HDC system 12HD is operable to allow a user to set a value of HDC set-speed parameter HDC_set-speed and to adjust the value of HDC_set-speed using the same controls as the cruise control system 16 and LSP control system 12. Thus, in the present embodiment, when the HDC system 12HD is controlling vehicle speed, the HDC system set-speed may be increased, decreased or set to an instant speed of the vehicle in a similar manner to the set-speed of the cruise control system 16 and LSP control system, using the same control buttons 173, 173R, 174, 175.

The HDC system 12HD is operable to allow the value of HDC_set-speed to be set to any value in the range from 2-30 kph.

If the HDC system 12HD is selected when the vehicle 100 is travelling at a speed of 50 kph or less and no other speed control system is in operation, the HDC system 12HD sets the value of HDC_set-speed to a value selected from a look-up table. The value output by the look-up table is determined in dependence on the identity of the currently selected transmission gear, the currently selected PTU gear ratio (Hi/LO) and the currently selected driving mode. The HDC system 12HD then causes the powertrain 129 and/or braking system 22 (via signal 42, FIG. 4) to slow the vehicle 100 to the HDC system set-speed provided the driver does not override the HDC system 12HD by depressing the accelerator pedal 161. It is to be understood that the HDC system 12HD may cause the powertrain 129 to apply negative torque to one or more wheels, for example by engine over-run braking, but cannot cause the powertrain 129 to apply a positive torque to a wheel.

If actual vehicle speed v_actual exceeds the set-speed value HDC_set-speed, the HDC system 12HD is configured to slow the vehicle 100 to the set-speed value at a deceleration rate not exceeding a maximum allowable rate. The rate is set as 1.25 ms-2 in the present embodiment, however other values are also useful. If the user subsequently presses the 'set-speed' button 173 the HDC system 12HD sets the value of HDC_set-speed to the instant vehicle speed provided the instant speed is 30 kph or less.

If the HDC system 12HD is selected (by depressing the HDC selector button 177 for more than the prescribed period when the HDC system 12HD and LSP control system 12 are switched off) and the vehicle 100 is travelling at a speed exceeding 50 kph, the HDC system 12HD ignores the request and provides an indication to the user that the request has been ignored.

It is to be understood that the VCU 10 is configured to implement a known Terrain Response (TR) (RTM) System of the kind described above in which the VCU 10 controls settings of one or more vehicle systems or sub-systems such as the powertrain controller 11 in dependence on a selected driving mode. The driving mode may be selected by a user by means of a driving mode selector 141S (FIG. 1). The driving modes may also be referred to as terrain modes, terrain response (TR) modes, or control modes.

In the embodiment of FIG. 1 four driving modes are provided: an 'on-highway' driving mode suitable for driving on a relatively hard, smooth driving surface where a relatively high surface coefficient of friction exists between the driving surface and wheels of the vehicle; a 'sand' driving mode suitable for driving over sandy terrain, being terrain characterized at least in part by relatively high drag, relatively high deformability or compliance and relatively low surface coefficient of friction; a 'grass, gravel or snow' (GGS) driving mode suitable for driving over grass, gravel or snow, being relatively slippery surfaces (i.e. having a relatively low coefficient of friction between surface and wheel and, typically, lower drag than sand); a 'rock crawl' (RC) driving mode suitable for driving slowly over a rocky surface; and a 'mud and ruts' (MR) driving mode suitable for driving in muddy, rutted terrain. Other driving modes may be provided in addition or instead. In the present embodiment the selector 141S also allows a user to select an 'automatic driving mode selection condition' in which the VCU 10 selects automatically the most appropriate driving mode as described in more detail below. The on-highway driving mode may be referred to as a 'special programs off'

(SPO) mode in some embodiments since it corresponds to a standard or default driving mode, and is not required to take account of special factors such as relatively low surface coefficient of friction, or surfaces of high roughness.

In some embodiments, including the present embodiment, the LSP control system 12 may be in either one of an active condition, a standby condition and an 'off' condition at a given moment in time. In the active condition, the LSP control system 12 actively manages vehicle speed by controlling powertrain torque and braking system torque. In the standby condition, the LSP control system 12 does not control vehicle speed until a user presses the resume button 173R or the 'set speed' button 173. In the off condition the LSP control system 12 is not responsive to input controls.

In the present embodiment the LSP control system 12 is also operable to assume an intermediate mode or condition similar to that of the active mode but in which the LSP control system 12 is prevented from commanding the application of positive drive torque to one or more wheels of the vehicle 100 by the powertrain 129. Thus, only braking torque may be applied, by means of the braking system 22 and/or powertrain 129. In the present embodiment, the intermediate mode is implemented by causing the HDC control system 12HD to control vehicle speed, with the value HDC_set-speed set substantially equal to LSP_set-speed. Other arrangements are also useful.

With the LSP control system 12 in the active condition, the user may increase or decrease the vehicle set-speed by means of the '+' and '−' buttons 174, 175. In addition, the user may also increase or decrease the vehicle set-speed by lightly pressing the accelerator or brake pedals 161, 163 respectively. In some embodiments, with the LSP control system 12 in the active condition the '+' and '−' buttons 174, 175 are disabled such that adjustment of the value of LSP_set-speed can only be made by means of the accelerator and brake pedals 161, 163. This latter feature may prevent unintentional changes in set-speed from occurring, for example due to accidental pressing of one of the '+' or '−' buttons 174, 175. Accidental pressing may occur for example when negotiating difficult terrain where relatively large and frequent changes in steering angle may be required. Other arrangements are also useful.

It is to be understood that in the present embodiment the LSP control system 12 is operable to cause the vehicle to travel in accordance with a value of set-speed in the range from 2-30 kph while the cruise control system 16 is operable to cause the vehicle to travel in accordance with a value of set-speed in the range from 25-150 kph although other values are also useful. If the LSP control system 12 is selected when the vehicle speed is above 30 kph but less than or substantially equal to 50 kph, the LSP control system 12 assumes the intermediate mode. In the intermediate mode, if the driver releases the accelerator pedal 161 while travelling above 30 kph the LSP control system 12 deploys the braking system 22 to gently slow the vehicle 100 to a value of set-speed corresponding to the value of parameter LSP_set-speed. Once the vehicle speed falls to 30 kph or below, the LSP control system 12 assumes the active condition in which it is operable to apply positive drive torque via the powertrain 129, as well as brake torque via the powertrain 129 (via engine braking) and the braking system 22 in order to control the vehicle in accordance with the LSP_set-speed value. If the LSP control system 12 is selected and no LSP set-speed value has been set, the LSP control system 12 assumes the standby mode, the system 12 becoming active once the 'set +' button 174 is depressed. In some embodiments, if the LSP control system 12 is selected when the vehicle speed is above 30 kph but less than or substantially equal to 50 kph, the system 12 deploys the braking system 22 to slow the vehicle 100 to 30 kph and prevents vehicle speed from exceeding 30 kph unless the driver over-rides the system 12 by depressing the accelerator pedal 161 or switching off the system 12.

It is to be understood that if the LSP control system 12 is in the active mode, operation of the cruise control system 16 is inhibited. The two systems 12, 16 therefore operate independently of one another, so that only one can be operable at any one time, depending on the speed at which the vehicle is travelling.

In the present embodiment, as noted above the cruise control HMI 18 and the LSP control HMI 20 are configured within the same hardware so that the speed selection is input via the same hardware.

Figure 4:
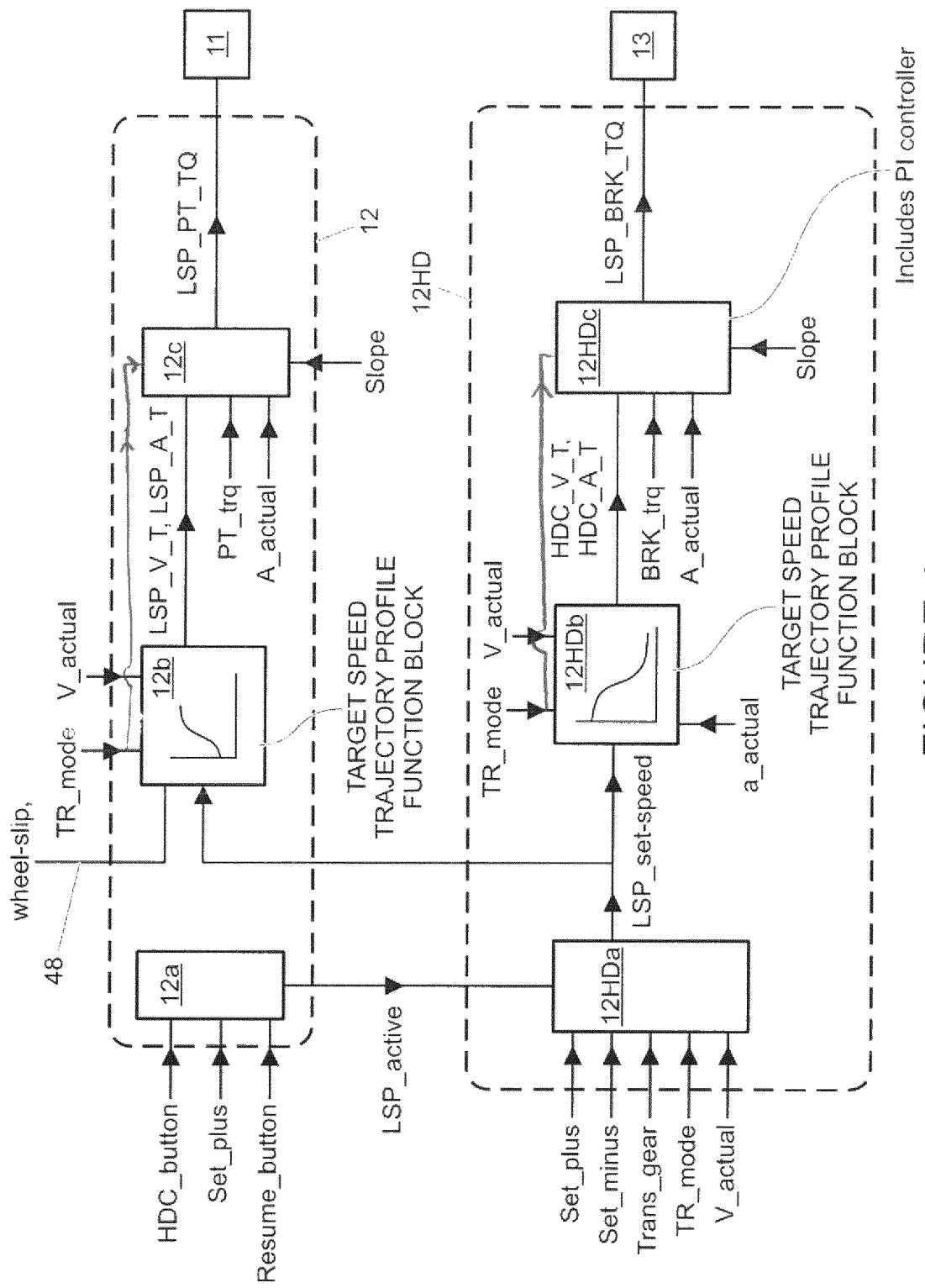
FIG. 4 is a schematic diagram of further features of the vehicle speed control system of FIG. 3.

FIG. 4 illustrates the means by which vehicle speed is controlled when the LSP control system 12 is in the active mode. When in the active mode the LSP control system 12 determines the amount of positive drive torque to be applied by the powertrain 129, LSP_PT_TQ, and causes the powertrain 129 to deliver this amount of torque by communicating the value of LSP_PT_TQ to the powertrain controller 11. The value of LSP_PT_TQ may be communicated to the powertrain controller 11 via the TC function block, which may arbitrate the value of LSP_PT_TQ in dependence on the amount of slip experienced by a driving wheel. Thus, the TC function block may reduce the value of LSP_PT_TQ output to the powertrain controller 11 when excessive slip is experienced.

When the LSP control system 12 is active, the amount of brake torque to be applied by the braking system 22, LSP_BRK_TQ, is determined by the HDC control system 12HD, which is effectively 'slaved' to the LSP control system 12 when the LSP control system 12 is active. The HDC system 12HD causes the braking system 22 to deliver this amount of brake torque by communicating the value of LSP_BRK_TQ to the ABS controller 13. It is to be understood that the LSP control system 12 may cause the HDC control system 12HD to command a non-zero value of LSP_BRK_TQ while the LSP control system 12 is commanding application of positive (or negative) powertrain torque, LSP_PT_TQ, in an automated implementation of 'two pedaling' where both brake and accelerator pedals are depressed by a driver to reduce wheel slip.

As shown in FIG. 4, the LSP control system 12 has an input function block 12a that receives the following signals: a signal HDC_button indicating whether HDC system selector button 177 is currently pressed; a signal set_plus indicating whether the 'set +' button 174 is currently pressed; and a signal Resume_button indicating whether the resume button 173R is currently pressed.

In the embodiment of FIG. 4, the LSP control system 12 is configured to become active and command application of positive powertrain torque as required if the HDC selector button 177 is pressed for less than three seconds while the LSP control system is not active and the 'set +' button is subsequently pressed within 3 seconds of release of the HDC selector button 177. Other time periods are also useful.

The LSP control system input function block 12a is arranged to communicate with a corresponding input function block 12HDa of the HDC control system 12HD. If the LSP control system assumes the active mode, the LSP control system input function block 12a provides a signal LSP_active to the HDC system 12HD signaling that the LSP control system 12 is in the active state. With the LSP control system 12 in the active state, the HDC system 12HD is configured to set the value of HDC_set-speed to the value of LSP_set-speed and to operate in a slave mode to the LSP control system 12. That is, the HDC control system 12HD is operable to command application of brake torque by the ABS controller 13 when commanded to do so by the LSP control system 12.

If neither the LSP control system 12 nor the HDC system 12HD are active and the HDC selector button 177 is pressed for 3 s or longer, the HDC system 12HD becomes active. Under such circumstances the HDC system 12HD is not slaved to the LSP control system 12 and the LSP control system 12 remains inactive.

If either the LSP control system 12 or the HDC system 12HD is active and the HDC selector button is pressed for less than 3 s, the active system 12, 12HD is deactivated.

As noted above, the HDC system 12HD is operable to apply brake torque to prevent vehicle speed exceeding HDC_set-speed (which is set equal to LSP_set-speed when the LSP control system is active), but not to apply positive powertrain torque.

The HDC control system input function block 12HDa is configured to output a value of LSP_set-speed to a target speed trajectory profile function block 12b of the LSP control system 12 as well as to a target speed trajectory profile function block 12HDb of the HDC control system 12HD. If the LSP control system 12 is activated with the vehicle substantially stationary, the value of LSP_set-speed is set to the minimum value at which the LSP control system 12 may cause a vehicle 100 to operate. In the present embodiment this speed is substantially 2 kph. Other speeds may be set instead of 2 kph.

If the LSP control system 12 is activated while the vehicle 100 is moving, the value of LSP_set-speed may be set to the instant vehicle speed, v_actual as determined by the VCU 10.

Function block 12b also receives as an input a signal TR_mode indicative of the driving mode (or 'TR mode') in which the vehicle 100 is currently operating, and signal v_actual, indicating the speed of the vehicle 100 over ground as determined by the VCU 10.

The function block 12b is configured to determine a target instant speed value LSP_V_T and a target acceleration value LSP_A_T being, respectively, an instant speed at which the vehicle 100 is required to travel and an instant rate at which the vehicle is required to accelerate to the instant speed, respectively. The function block 12b receives as inputs the values of LSP_set-speed, TR_mode and v_actual. The value of each of these parameters is input to a look-up table which generates the values of LSP_V_T and LSP_A_T. The values of the parameters LSP_V_T and LSP_A_T are input to a PI (proportional-integral) control module 12c to generate a value of LSP_PT_TQ that is output to the powertrain controller 129. Function block 12b controls the value of LSP_V_T and the value of LSP_A_T such that the target speed gradually becomes equal to LSP_set-speed according to target speed trajectory profiles stored in a memory thereof.

The PI control module 12c also receives as an input a value corresponding to the instant value of torque, PT_trq, being generated by the powertrain 129, a value of a parameter A_actual corresponding to the actual instant rate of acceleration of the vehicle 100, the signal TR_mode and a value of a parameter 'slope' corresponding to a steepness of a slope on which the vehicle 100 is driving. It is to be understood that A_actual may be positive or negative depending on whether the vehicle 100 is accelerating or decelerating. The value of 'slope' may be positive or negative depending on whether the vehicle 100 is ascending or descending a slope.

It is to be understood that in the present embodiment the values of proportional feedback gain and integral feedback gain are adjusted in dependence on the TR mode in which the vehicle 100 is operating, as determined by reference to parameter TR_mode, and the driving surface gradient, as determined by reference to parameter slope.

It is to be understood therefore, that the data stored in the look-up table associated with function block 12b is able to take account of differences in the optimum rates of acceleration and deceleration for the different TR modes. Function block 12c, in turn, adjusts these rates in dependence on the gradient of the driving surface according to stored data. The manner in which the rates are adjusted in dependence on slope is further dependent on the TR mode, and therefore the function block 12c receives the signals indicative of TR mode and driving surface gradient.

In the present embodiment the values are adjusted such that when the vehicle is in the 'Sand' TR mode and ascending a slope, the rate at which the value of LSP_PT_TQ increases when an increase in powertrain torque is required, due to target speed undershoot, is greater (i.e. more aggressive) than that when the vehicle is traversing level ground. When the vehicle is in the 'Sand' TR mode and ascending a slope and a decrease in powertrain torque is required, due to target speed overshoot, the rate at which LSP_PT_TQ decreases is lower (i.e. less aggressive) than in the case where the vehicle is traversing level ground. This is because gravity is acting in favor of reducing vehicle speed even in the absence of brake torque from the braking system 22, such that vehicle speed will reduce at a greater rate than if the vehicle 100 were travelling over level ground.

In contrast, if the vehicle 100 is in the GGS or the MR TR mode and ascending a slope (i.e. over a driving surface with a positive gradient), the values of proportional feedback gain and integral feedback gain are adjusted such that the rate at which the amount of commanded powertrain torque increases, when an increase in powertrain torque is required due to target speed undershoot, is lower (i.e. less aggressive) than that when the vehicle is traversing level ground. This reduces the risk of excessive wheel slip, and therefore loss of traction.

When the vehicle 100 is in the GGS or the MR TR mode and ascending a slope and a decrease in powertrain torque is required, due to target speed overshoot, the rate at which LSP_PT_TQ decreases is lower (i.e. less aggressive) than in the case where the vehicle is traversing level ground. This is at least in part because gravity is acting in favor of reducing vehicle speed even in the absence of brake torque from the braking system 22, such that vehicle speed will reduce at a greater rate than if the vehicle 100 were travelling over level ground.

Figure 6:
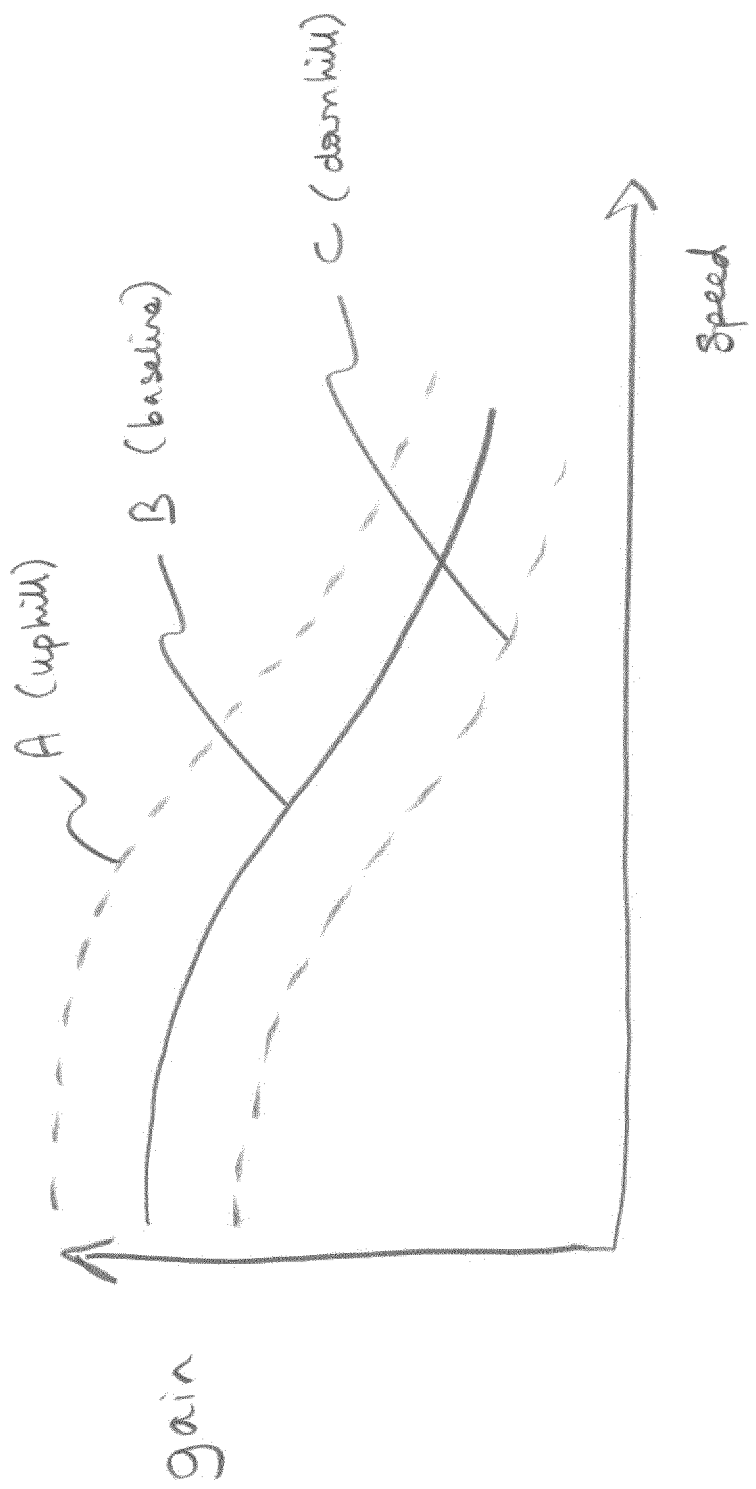
FIG. 6 is a schematic illustration of controller gain profiles employed for a sand terrain response mode when traveling over driving surfaces of positive gradient (uphill, profile A), substantially no gradient (i.e. substantially horizontal, profile B) and negative gradient (downhill, profile B)

FIG. 6 illustrates schematically the general form of three gain profiles A, B, C corresponding to data stored by function block 12b for use when operating in the sand TR mode when actual vehicle speed falls below the target speed, i.e. target speed undershoot occurs. The gain profiles are employed by the function block 12c to control the rate of increase of the amount of tractive torque that the powertrain controller 11 is requested to deliver.

Profile B is a baseline profile and is used when travelling over a substantially horizontal surface and target speed undershoot occurs. Profile A is used when travelling uphill and target speed undershoot occurs; it can be seen that the value of gain employed as a function of speed can be seen to be higher when travelling uphill compared to when travelling over a substantially horizontal surface. That is, the function block 12*c* is caused to command a more aggressive increase in powertrain torque when undershoot occurs when travelling uphill, compared with travel over a substantially horizontal surface.

Profile C is used when travelling downhill and target speed undershoot occurs. It can be seen that the value of gain employed as a function of speed is lower when travelling downhill compared to when travelling over a substantially horizontal surface. That is, the function block 12*c* is caused to command a less aggressive increase in powertrain torque when undershoot occurs when travelling downhill, compared with travel over a substantially horizontal surface. This is due at least in part to the fact that gravity will tend to assist in the correction undershoot in the case of downhill driving while gravity will tend to oppose correction of undershoot when travelling uphill.

Figure 7:
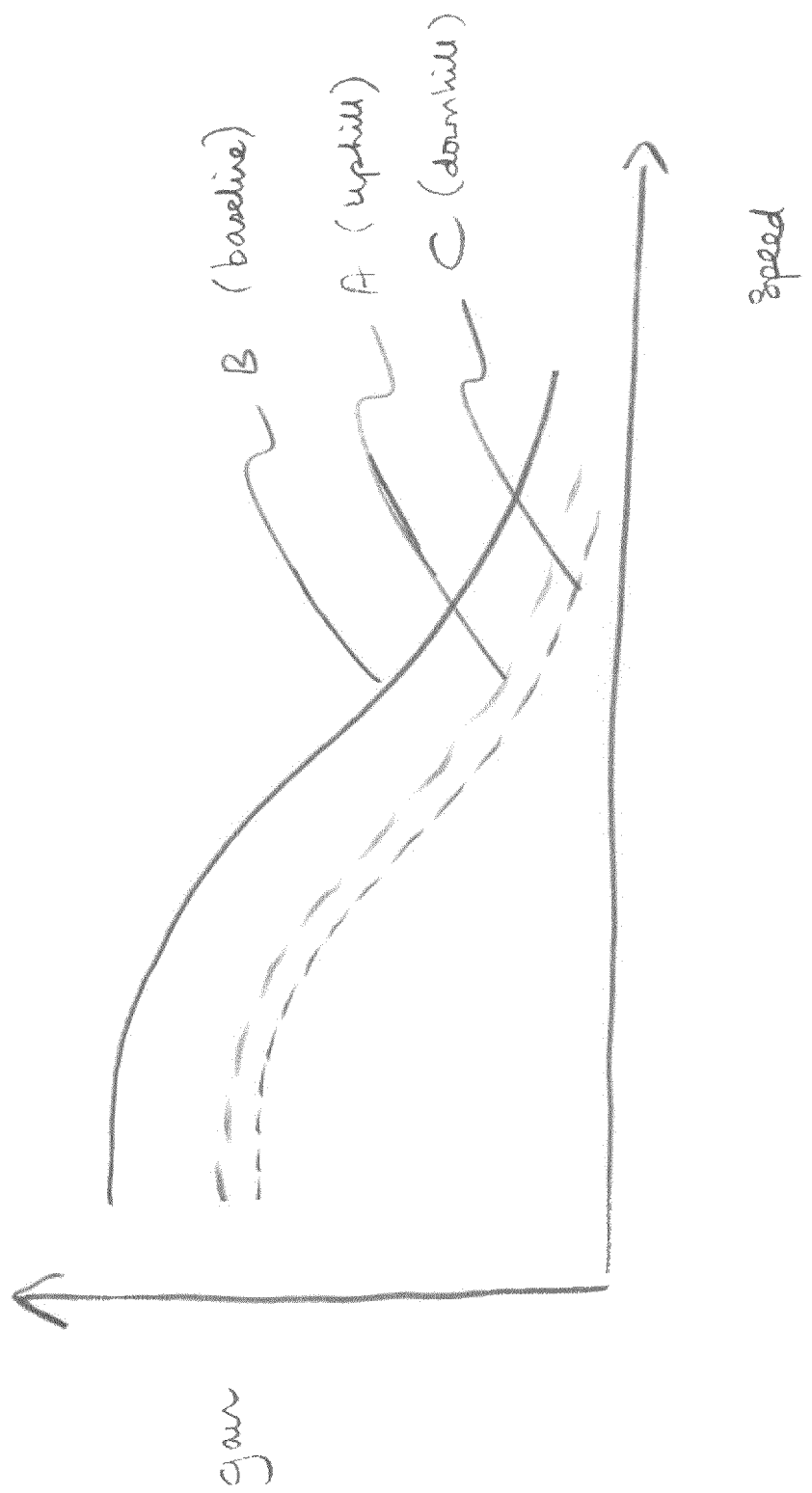
FIG. 7 is a schematic illustration of controller gain profiles employed for a GGS (grass/gravel/snow) terrain response mode when traveling over driving surfaces of positive gradient (uphill, profile A), substantially no gradient (i.e. substantially horizontal, profile B) and negative gradient (downhill, profile B).

FIG. 7 illustrates schematically the general form of three gain profiles A, B, C corresponding to data stored by function block 12*b* for use when operating in the GGS mode when actual vehicle speed falls below the target speed, i.e. target speed undershoot occurs. The gain profiles are employed by the function block 12*c* to increase the amount of tractive torque that the powertrain controller 11 is requested to deliver.

Profile B is a baseline profile and is used when travelling over a substantially horizontal surface and target speed undershoot occurs. Profile A is used when travelling uphill and target speed undershoot occurs; it can be seen that the value of gain employed as a function of speed can be seen to be lower when travelling uphill compared to when travelling over a substantially horizontal surface. That is, the function block 12*c* is caused to command a less aggressive increase in powertrain torque when undershoot occurs when travelling uphill, compared with travel over a substantially horizontal surface. This has the advantage that the wheels are less likely to experience excessive slip, increasing the risk that the vehicle fails to make adequate progress over terrain, and/or the risk that undesirable modification of the driving surface occurs due to wheel slip. Surface modification is typically less problematic in the case of driving over sand.

Profile C is used when travelling downhill and target speed undershoot occurs. It can be seen that the value of gain employed as a function of speed is lower when travelling downhill compared to when travelling over a substantially horizontal surface, in a similar manner to the case when travelling uphill in the GGS mode. That is, the function block 12*c* is caused to command a less aggressive increase in powertrain torque when undershoot occurs when travelling downhill, compared with travel over a substantially horizontal surface.

In the embodiment illustrated in FIG. 7 the value of gain is lower, for travel downhill over a driving surface having a given value of slope, compared with the gain value for travel uphill over a driving surface having the same value of slope as shown by the fact that profile C is below profile A in the figure. However, the value of gain for travel downhill may be higher than, or substantially the same as, the value for travel uphill, in some alternative embodiments.

If the vehicle is operating in the MR mode, the general relative form of the gain profiles for speed undershoot when travelling uphill, over substantially horizontal ground, or downhill, have a similar relationship to that illustrated in FIG. 7, i.e. the gain values decrease when travelling uphill or downhill compared to travel over substantially level ground.

In order to prevent or at least reduce passenger discomfort due to rapid changes in acceleration rate (jerk), the LSP control system 12 limits the rate of change of acceleration of the vehicle 100, LSP_A_T, such that it does not exceed a prescribed maximum value. The value of LSP_A_T is set in dependence on TR mode, the value for TR_mode=sand being higher than the value for TR_mode=SPO, GGS or MR due to the higher drag imposed on a vehicle 100 traversing sand compared with a vehicle traversing a dry asphalt highway surface, a grass, gravel or snow surface, or a muddy or rutted surface.

Furthermore, the value of LSP_A_T is controlled such that a steady state rate of acceleration is established the value of which is determined according to the value of TR_mode. The steady state rate of acceleration is higher for high-drag surfaces such as sand compared with lower drag surfaces in order to reduce a risk that a vehicle becomes stuck, i.e. unable to make adequate progress across terrain.

Turning to the HDC control system 12HD, the system 12HD has a function block 12HDb similar to the function block 12*b* of the LSP control system 12 that also receives signals TR_mode, v_actual and A_actual. Function block 12HDb is configured to determine, by reference to a look-up table, an instant value of a parameter HDC_V_T and parameter HDC_A_T based on the signals TR_mode, v_actual and A_actual, and to output the value of parameters HDC_V_T and HDC_A_T to a PI control module 12HDc. The value of parameter HDC_V_T corresponds to a required target instant speed of the vehicle 100 and the value of parameter HDC_A_T corresponds to a target instant rate of deceleration of the vehicle 100. Function block 12HDb controls the value of HDC_V_T and the value of HDC_A_T such that the target speed gradually becomes equal to HDC_set-speed according to trajectory profiles stored in a memory thereof.

The value of HDC_A_T is controlled such that a maximum allowable rate of change of acceleration of the vehicle (referred to as a maximum jerk value) is not exceeded, the maximum allowed value of HDC_A_T when TR_mode=sand being lower than that when TR_mode=SPO, GGS or MR due to the more rapid deceleration of the vehicle when travelling over high drag terrain such as sand compared with lower drag terrain, when the amount of drive torque to a wheel is reduced, due to the increased drag. Furthermore, the value of HDC_A_T is controlled such that a steady state rate of deceleration is established the value of which is determined according to the value of TR_mode. The steady state rate of deceleration is arranged to be lower for high-drag surfaces such as sand compared with low-drag asphalt surfaces in order to reduce a risk that sand displaced by a wheel builds up in front of a wheel and causes abrupt deceleration. Abrupt deceleration typically compromises vehicle composure and is therefore typically undesirable.

The values of HDC_A_T and HDC_V_T are input to a PI (proportional-integral) control module 12HDc which generates a value of HDC_BRK_TQ that is output to the ABS controller 13.

The PI control module 12HDc also receives as an input a value corresponding to the instant value of brake torque, BRK_trq, being generated by the braking system 22, along with values of A_actual, 'slope' and TR_mode. It is to be understood that the value of A_actual may be positive or negative depending on whether the vehicle 100 is accelerating or decelerating. The value of 'slope' is used to adjust a value of proportional feedback gain and integral feedback gain of the PI control module 12HDc according to the slope of the driving surface and the TR_mode in which the vehicle 100 is driving. Thus, the function block 12HDc adjusts the values of proportional and integral feedback gain constants employed by PI control module 12c in dependence on the gradient of the driving surface and TR mode.

As noted above, when the LSP control system 12 is active, the HDC control system 12HD is slaved to the LSP control system 12 and is configured to apply brake torque to the wheels as required. The LSP control system 12 is configured to command less aggressive application of brake torque by the HDC control system 12HD when the vehicle is operating in the sand mode compared to the SPO mode in order to reduce the risk that one or more wheels sink into the relatively compliant surface and cause a relatively abrupt and substantial increase in resistance to vehicle movement. In the case of operation in the GGS or MR TR modes, When the vehicle 100 is travelling uphill in one of the GGS or MR TR modes and target speed overshoot occurs, the LSP control system 12 is configured to cause the PI control module 12HDc of the HDC control system 12HD to operate with reduced gain values in order to reduce vehicle speed (in the event braking is required) due to the effect of gravity in assisting deceleration of the vehicle 100.

In contrast, when the vehicle is travelling downhill in one of the GGS or MR TR modes and target speed overshoot occurs, the LSP control system 12 is configured to cause the PI control module 12HDc of the HDC control system 12HD to operate with increased gain values relative to those employed when travelling over substantially horizontal terrain. This results in more aggressive braking when travelling downhill, and assists in preventing excessive target overshoot due to the effect of gravity in resisting deceleration of the vehicle 100. However, the gains are not set to excessively high values, in order to reduce the risk of excessive wheel slip due to the relatively low surface coefficient of friction of the surfaces for which the GGS and MR TR modes are optimized, relative to dry tarmac surfaces for which the SPO mode is optimized.

It is to be understood that in some embodiments in which a powertrain 129 has one or more electric machines operable as a generator, negative torque may be applied by the powertrain 129 to one or more wheels by the one or more electric machines. Negative torque may also be applied by means of engine braking in some circumstances, depending at least in part on the speed at which the vehicle 100 is moving. If one or more electric machines are provided that are operable as propulsion motors, positive drive torque may be applied by means of the one or more electric machines when positive drive torque is commanded by the driver or LSP control system 12.

In order to cause application of the necessary positive or negative torque to the wheels, the VCU 10 may command that positive or negative torque is applied to the vehicle wheels by the powertrain 129 and/or that a braking force is applied to the vehicle wheels by the braking system 22, either or both of which may be used to implement the change in torque that is necessary to attain and maintain a required vehicle speed. In some embodiments torque is applied to the vehicle wheels individually, for example by powertrain torque vectoring, so as to maintain the vehicle at the required speed. Alternatively, in some embodiments torque may be applied to the wheels collectively to maintain the required speed, for example in vehicles having drivelines where torque vectoring is not possible. In some embodiments, the powertrain controller 11 may be operable to implement torque vectoring to control an amount of torque applied to one or more wheels by controlling a driveline component such as a rear drive unit, front drive unit, differential or any other suitable component. For example, one or more components of the driveline 130 may include one or more clutches operable to allow an amount of torque applied to one or more wheels to be varied. Other arrangements may also be useful.

Where a powertrain 129 includes one or more electric machines, for example one or more propulsion motors and/or generators, the powertrain controller 11 may be operable to modulate torque applied to one or more wheels in order to implement torque vectoring by means of one or more electric machines.

In some embodiments the LSP control system 12 may receive a signal wheel_slip (also labelled 48 in FIG. 3 and FIG. 4) indicative of a wheel slip event having occurred. This signal 48 is also supplied to the on-highway cruise control system 16 of the vehicle, and which in the case of the latter triggers an override or inhibit mode of operation in the on-highway cruise control system 16 so that automatic control of vehicle speed by the on-highway cruise control system 16 is suspended or cancelled. However, the LSP control system 12 is not arranged to cancel or suspend operation on receipt of wheel_slip signal 48. Rather, the system 12 is arranged to monitor and subsequently manage wheel slip so as to reduce driver workload. During a slip event, the LSP control system 12 continues to compare the measured vehicle speed with the value of LSP_set-speed, and continues to control automatically the torque applied to the vehicle wheels (by the powertrain 129 and braking system 22) so as to maintain vehicle speed at the selected value. It is to be understood therefore that the LSP control system 12 is configured differently to the cruise control system 16, for which a wheel slip event has the effect of overriding the cruise control function so that manual operation of the vehicle must be resumed, or speed control by the cruise control system 16 resumed by pressing the resume button 173R or set-speed button 173.

In a further embodiment of the present invention (not shown) a wheel slip signal 48 is derived not just from a comparison of wheel speeds, but further refined using sensor data indicative of the vehicle's speed over ground. Such a speed over ground determination may be made via global positioning (GPS) data, or via a vehicle mounted radar or laser based system arranged to determine the relative movement of the vehicle 100 and the ground over which it is travelling. A camera system may be employed for determining speed over ground in some embodiments.

At any stage of the LSP control process the user can override the function by depressing the accelerator pedal 161 and/or brake pedal 163 to adjust the vehicle speed in a positive or negative sense. However, in the event that a wheel slip event is detected via signal 48, the LSP control system 12 remains active and control of vehicle speed by the LSP control system 12 is not suspended. As shown in FIG. 4, this may be implemented by providing a wheel slip event signal 48 to the LSP control system 12, wheel slip then being managed by the LSP control system 12. In the present embodiment the SCS 14 generates the wheel slip event signal 48 and supplies it to the LSP control system 12 and cruise control system 16. In some embodiments the ABS controller 13 generates the wheel slip event signal 48. Other arrangements may be useful.

A wheel slip event is triggered when a loss of traction occurs at any one of the vehicle wheels. Wheels and tires may be more prone to losing traction when travelling for example on snow, ice, mud or sand and/or on steep gradients or cross-slopes. A vehicle 100 may also be more prone to losing traction in other environments where the terrain is more uneven or slippery compared with driving on a highway in normal on-road conditions. Embodiments of the present invention therefore find particular benefit when the vehicle 100 is being driven in an off-road environment, or in conditions in which wheel slip may commonly occur. Manual operation in such conditions can be a difficult and often stressful experience for the driver and may result in an uncomfortable ride.

The vehicle 100 is also provided with additional sensors (not shown) which are representative of a variety of different parameters associated with vehicle motion and status. These may be inertial systems unique to the LSP or HDC control systems 12, 12HD or part of an occupant restraint system or any other sub-system which may provide data from sensors such as gyros and/or accelerometers that may be indicative of vehicle body movement and may provide a useful input to the LSP and/or HDC control systems 12, 12HD. The signals from the sensors provide, or are used to calculate, a plurality of driving condition indicators (also referred to as terrain indicators) which are indicative of the nature of the terrain conditions over which the vehicle 100 is travelling.

The sensors (not shown) on the vehicle 100 include, but are not limited to, sensors which provide continuous sensor outputs to the VCU 10, including wheel speed sensors, as mentioned previously, an ambient temperature sensor, an atmospheric pressure sensor, tire pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the SCS 14, a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used.

The VCU 10 also receives a signal from the steering controller 170C. The steering controller 170C is in the form of an electronic power assisted steering unit (ePAS unit) 170C. The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C.

The VCU 10 evaluates the various sensor inputs to determine the probability that each of a plurality of different control modes (driving modes) for the vehicle subsystems is appropriate, with each control mode corresponding to a particular terrain type over which the vehicle is travelling (for example, mud and ruts, sand, grass/gravel/snow).

If the user has selected operation of the vehicle in the automatic driving mode selection condition, the VCU 10 then selects the most appropriate one of the control modes and is configured automatically to control the subsystems according to the selected mode. This aspect of the invention is described in further detail in our co-pending patent application nos. GB1111288.5, GB1211910.3 and GB1202427.9, the contents of each of which is incorporated herein by reference.

As indicated above, the nature of the terrain over which the vehicle is travelling (as determined by reference to the selected control mode) may also be utilized in the LSP control system 12 to determine an appropriate increase or decrease in vehicle speed. For example, if the user selects a value of user set-speed that is not suitable for the nature of the terrain over which the vehicle is travelling, the system 12 is operable to automatically adjust the vehicle speed downwards by reducing the speed of the vehicle wheels. In some cases, for example, the user selected speed may not be achievable or appropriate over certain terrain types, particularly in the case of uneven or rough surfaces. If the system 12 selects a set-speed (a value of LSP_set-speed) that differs from the user-selected set-speed user_set-speed, a visual indication of the speed constraint is provided to the user via the LSP HMI 20 to indicate that an alternative speed has been adopted.

It is to be understood that, when driving downhill on sand, it may be desirable not to apply negative torque to wheels of the vehicle 100. As described above, this is because the wheels will have a tendency to dig into the sand, the effect being enhanced by the nose-down, weight forward condition during vehicle descent. This may be achieved by relaxing the rate at which negative torque is applied by a braking system 22, in the present embodiment by reducing the proportional and integral feedback gain values of the PI control module 12HDc.

In some embodiments, the VCU 10 may be configured such that the LSP control system 12 tends to allow the value of v_actual to increase to become substantially equal to LSP_set-speed by coasting rather than by applying positive powertrain torque. in order to achieve this, in the present embodiment the proportional and integral feedback gain values of the PI control module 12c are set to relatively low values when the value of 'slope' indicates a downhill slope. The actual proportional and integral feedback gain values may in some embodiments be arranged to become progressively higher as the value of 'slope' indicates an increasingly steep downhill slope. In some embodiments the actual proportional and integral feedback gain values are set to sufficiently low values that they substantially prevent application of positive torque as the vehicle accelerates downhill towards LSP_set-speed.

It is to be understood that, in some embodiments, in addition to providing a signal TR_mode to the function blocks 12b, 12HDb, a parameter indicative of an actual amount of drag on a vehicle due to external forces may be provided. The function blocks 12b, 12HDb may be arranged to determine, respectively, the values of LSP_V_T, LSP_A_T and HDC_V_T, HDC_A_T in dependence on the amount of drag as well as or instead of the selected TR mode. It is to be understood that travel over sand corresponds to travel over terrain for which the amount of external drag is relatively high. Means for measuring external drag forces on a vehicle are well known.

In some situations, a vehicle 100 may descend an incline at a speed below LSP_set-speed and the LSP control system 12 may be required to cause application of positive powertrain drive torque to accelerate the vehicle 100 to LSP_set-speed. In such circumstances, in some embodiments function blocks 12b, 12c may be configured to set the value of LSP_PT_TQ to a value corresponding to substantially no positive powertrain drive torque prior to v_actual attaining LSP_set-speed. This is so as to prevent excessive overshoot of LSP_set-speed by v_actual, and be performed in dependence on the value of 'slope' and TR mode. This procedure may enable the vehicle 100 to descend the slope without a requirement to apply brake torque to one or more wheels. Application of brake torque may give rise to sudden, undesirably high deceleration and degrade vehicle composure. It is to be understood that the LSP control system 12 may take advantage of a drag force on the vehicle 100 due to the high drag terrain to mitigate excessive over-speed as the vehicle descends the slope. Should excessive overshoot occur, the HDC control system 12HD may be arranged to cause application of brake torque in a more gentle manner (by appropriate control of the values of HDC_V_T and HDC_A_T).

Other arrangements may be useful.

Some embodiments of the present invention enable vehicle operation with enhanced composure on driving surfaces of different gradients.

In addition, some embodiments of the present invention have the advantage that sudden over-braking on high drag terrain such as sand may be prevented. Some embodiments of the present invention give rise to greatly enhanced vehicle composure when driving across varied terrain, especially over high drag, deformable surfaces such as sand.

It will be understood that the embodiments described above are given by way of example only and are not intended to limit the invention, the scope of which is defined in the appended claims.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A speed control system for a vehicle, comprising:
an electronic controller configured to automatically cause application of positive and negative torque to one or more wheels of a vehicle to cause a vehicle to travel in accordance with a target speed value;
one or more electrical input(s) configured to receive information indicative of a set speed, and information indicative of a terrain mode,
the electronic controller being configured to define the target speed value in accordance with the information indicative of the set speed and the information indicative of a terrain mode,
the one or more electrical input(s) configured to receive information indicative of a gradient of a driving surface over which the vehicle is driving,
the electronic controller being configured to control the rate of change of the amount of torque applied to the one or more wheels in accordance with the target speed value, the rate of change of the amount of torque being adjusted in dependence at least in part on the information indicative of a terrain mode and the information indicative of the gradient of the driving surface.

2. The system according to claim 1 wherein the electronic controller is configured to cause the vehicle to travel at the target speed, the electronic controller being configured to control the rate of change of the amount of torque applied to the one or more wheels, in order to maintain the vehicle traveling at the target speed value, in dependence at least in part on the gradient of the driving surface.

3. The control system according to claim 2 wherein the electronic controller is configured wherein when actual vehicle speed is greater than the target speed value, the electronic controller causes a reduction in torque applied to the one or more wheels in order to cause the vehicle to travel at the target speed at a rate that is lower for a given deviation in speed above the target speed than in the case of a corresponding deviation below the target speed value.

4. The control system according to claim 3 wherein the electronic controller is configured wherein when actual vehicle speed is greater than the target speed value and the vehicle is traveling uphill, the electronic controller causes a reduction in torque applied to the one or more wheels in order to cause the vehicle to travel at the target speed at a rate that is equal to or lower than in the case of a corresponding deviation in vehicle speed above the target speed whilst traveling over a horizontal driving surface.

5. The control system according to claim 2 wherein the electronic controller is configured wherein when actual vehicle speed is greater than the target speed value and the vehicle is travelling downhill, the electronic controller causes a reduction in torque applied to the one or more wheels in order to cause the vehicle to travel at the target speed at a rate that is equal to or lower than in the case of a corresponding deviation in vehicle speed above the target speed whilst traveling over a horizontal driving surface.

6. The control system according to claim 2 wherein the electronic controller is configured wherein when actual vehicle speed is greater than the target speed value and the vehicle is travelling downhill, the electronic controller causes a reduction in torque applied to the one or more wheels, in order to cause the vehicle to travel at the target speed, at a rate that is greater than in the case of a corresponding deviation in vehicle speed above the target speed whilst traveling over a horizontal driving surface.

7. The control system according to claim 2 configured to cause the vehicle to accelerate from a first speed to the target speed value, where the first speed is less than the target speed value, at least in part according to stored data in respect of target rate of acceleration as a function of speed, wherein the value of target rate of acceleration according to which the vehicle is caused to accelerate is determined in further dependence at least in part on the driving surface gradient.

8. The control system according to claim 2 configured to cause a vehicle to decelerate from a second speed to the target speed value, where the second speed is greater than the target speed value, according to stored data in respect of target rate of deceleration as a function of speed, wherein the target rate of deceleration according to which the vehicle is caused to decelerate is determined in further dependence at least in part on the driving surface gradient.

9. The control system according to claim 2 configured to control a rate of change of vehicle speed towards the target speed iteratively by causing the vehicle to achieve an intermediate instant target speed, the value of intermediate instant target speed and therefore vehicle speed being caused to change in an iterative manner towards the target speed value at a required rate.

10. The control system according to claim 1 wherein the electronic controller is configured wherein when actual vehicle speed is less than the target speed value and the information indicative of surface gradient indicates the vehicle is traveling uphill, the electronic controller causes the vehicle to accelerate towards the target speed value at a rate that is higher than when driving on a horizontal surface.

11. The control system according to claim 10 wherein the electronic controller is configured wherein when actual vehicle speed is less than the target speed value, the electronic controller causes the vehicle to accelerate towards the target speed value at a rate that is increasingly higher for increasingly higher values of uphill driving surface gradient.

12. The control system according to claim 1 wherein the electronic controller is configured wherein when actual vehicle speed is less than the target speed value and the information indicative of surface gradient indicates the vehicle is traveling uphill, electronic controller causes the vehicle to accelerate towards the target speed value at a rate that is lower than when driving on a horizontal surface.

13. The control system according to claim 12 wherein the electronic controller is configured wherein when actual vehicle speed is less than the target speed value, the electronic controller causes the vehicle to accelerate towards the target speed value at a rate that is increasingly lower for increasingly higher values of uphill driving surface gradient.

14. The control system according to claim 1 operable to control a rate of change of vehicle speed so as not to exceed a prescribed jerk value wherein the prescribed jerk value is set in dependence on the gradient of the driving surface.

15. The control system according to claim 1 wherein the terrain mode is one of a plurality of driving modes in which each one of a plurality of vehicle subsystems is caused to operate in one of a plurality of configuration modes of that subsystem, the subsystem configuration mode being determined in dependence on the selected driving mode.

16. The control system according to claim 15 configured wherein the electronic controller is operable to control the rate of change of the amount of torque applied to the one or more wheels, in order to maintain the vehicle traveling in accordance with the target speed value, in dependence at least in part on the information indicative of driving surface gradient only if the vehicle is operating in a driving mode that is a member of a predetermined group of one or more of the plurality of driving modes.

17. The control system according to claim 16 configured wherein when actual vehicle speed is less than the target speed value and the information indicative of surface gradient indicates the vehicle is traveling uphill, the electronic controller causes the vehicle to accelerate towards the target speed value at a rate that is lower than when driving on a horizontal surface if the vehicle is operating in a driving mode that is a member of a first group of one or more of the driving modes and is not a driving mode that is not a member of the first group.

18. The control system according to claim 17 wherein the first group of driving modes comprises at least one driving mode adapted for driving on a driving surface of relatively low surface coefficient of friction, wherein the first group of driving modes comprises at least one driving mode adapted for driving on a driving surface of relatively low surface coefficient of friction excluding a mode adapted for driving on sand, and wherein the first group of driving modes comprises at least one driving mode adapted for driving on at least one of an icy surface, grass, gravel, snow and mud.

19. A vehicle comprising the speed control system according to claim 1.

20. A method of controlling a vehicle implemented by means of a control system, comprising:
    automatically causing application of positive and negative torque to one or more wheels of a vehicle to cause a vehicle to travel in accordance with a target speed value;
    receiving information indicative of a set speed, and information indicative of a terrain response mode,
    defining the target speed value in accordance with the information indicative of a set speed and the information indicative of a terrain response mode,
    receiving information indicative of a gradient of a driving surface over which the vehicle is driving, and
    while causing the vehicle to travel in accordance with the target speed value, controlling the rate of change of the amount of torque applied to the one or more wheels in dependence at least in part on the information indicative of a terrain mode and the information indicative of a gradient of the driving surface.

21. A non-transitory computer-readable storage medium storing instructions thereon that when executed by one or more electronic processors causes the one or more electronic processors to carry out the method of claim 20.

* * * * *